(12) United States Patent
Kang et al.

(10) Patent No.: US 8,886,410 B2
(45) Date of Patent: Nov. 11, 2014

(54) METHODS OF CONTROLLING FOUR-WHEEL STEERED VEHICLES

(71) Applicant: Honda Motor Co., Ltd., Tokyo (JP)

(72) Inventors: Xiaodi Kang, Dublin, OH (US); Christopher J. Cymbal, Marysville, OH (US); David A. Thompson, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/765,783

(22) Filed: Feb. 13, 2013

(65) Prior Publication Data

US 2014/0229072 A1    Aug. 14, 2014

(51) Int. Cl.
*B62D 6/00* (2006.01)
*B62D 7/15* (2006.01)

(52) U.S. Cl.
CPC ............... *B62D 6/002* (2013.01); *B62D 7/159* (2013.01)
USPC ............... 701/42; 701/22; 701/36; 701/41; 701/70; 180/197; 180/413

(58) Field of Classification Search
CPC ................... B62D 6/002; B62D 6/00
USPC ............ 701/37, 41, 36, 42, 70; 180/197, 413, 180/204
See application file for complete search history.

(56) References Cited

U.S. PATENT DOCUMENTS

| | | | |
|---|---|---|---|
| 5,297,646 A | 3/1994 | Yamamura et al. | |
| 5,742,918 A | 4/1998 | Ashrafi et al. | |
| 5,878,357 A | 3/1999 | Sivashankar et al. | |
| 6,553,293 B1* | 4/2003 | Hac | 701/42 |
| 6,560,524 B2 | 5/2003 | Lin et al. | |
| 6,625,529 B2* | 9/2003 | Obata et al. | 701/41 |
| 6,834,543 B2* | 12/2004 | Kin et al. | 73/146 |
| 6,929,086 B1* | 8/2005 | Husain et al. | 180/413 |
| 7,085,641 B2* | 8/2006 | Post, II | 701/70 |
| 7,136,730 B2* | 11/2006 | Lu et al. | 701/36 |
| 7,316,288 B1* | 1/2008 | Bennett et al. | 180/413 |
| 7,455,142 B2* | 11/2008 | Post, II | 180/197 |
| 8,255,120 B2* | 8/2012 | Mikuriya et al. | 701/42 |
| 8,494,718 B2* | 7/2013 | Muth et al. | 701/42 |
| 2005/0096830 A1* | 5/2005 | Ohta et al. | 701/91 |
| 2006/0048976 A1 | 3/2006 | Deguchi et al. | |
| 2013/0110332 A1* | 5/2013 | Hwang | 701/22 |

OTHER PUBLICATIONS

U.S. Appl. No. 13/765,768; Titled: Four-Wheel Steered Vehicle and Torque Distribution Control Methods for Same; Filed: Feb. 13, 2013; Inventors: Xiaodi Kang et al., in its entirety.

(Continued)

*Primary Examiner* — Thomas G Black
*Assistant Examiner* — Wae Louie
(74) *Attorney, Agent, or Firm* — Ulmer & Berne LLP

(57) ABSTRACT

Methods for controlling a vehicle are provided. The vehicle includes a pair of steerable front wheels and a pair of steerable rear wheels. A steering angle of at least one of the steerable rear wheels is detected. A feed-forward lateral acceleration value is determined based upon the detected steering angle and a scaling factor. Operation of the steerable front wheels and the steerable rear wheels is controlled in response to the feed-forward lateral acceleration value.

11 Claims, 5 Drawing Sheets

(56) References Cited

OTHER PUBLICATIONS

Andreasson, Johan et al., "On Road Vehicle Motion Control—striving toward synergy," Proceedings of AVEC '06, The 8th International Symposium on Advanced Vehicle Control, Aug. 20-24, 2006, Taipei, Taiwan, 7 pages in its entirety.

He, Junjie et al., "Coordination of active steering, driveline, and braking for integrated vehicle dynamics control," Proceedings of the Institution of Mechanical Engineers vol. 220, Part D: Journal Automobile Engineering, May 18, 2006, pp. 1401-1421.

Ono, E. et al., "Vehicle dynamics integrated control for four-wheel-distributed steering and four-wheel-distributed traction/braking systems," Vehicle System Dynamics, Feb. 2006, pp. 139-151, vol. 44, No. 2, Taylor & Francis Group.

Arabi, Samaneh et al., "Design of an Integrated Active Front Steering and Active Rear Differential Controller using Fuzzy Logic Control," Proceedings of the World Congress on Engineering, Jun. 30-Jul. 2, 2010, vol. II, London, U.K., 6 pages in its entirety.

Sood, Anshul, Non-Final Office Action; Notification Date of Jul. 14, 2014; U.S. Appl. No. 13/765,768; Titled: Four-Wheel Steered Vehicle and Torque Distribution Control Methods for Same; Inventors: Xiaodi Kang et al., in its entirety.

\* cited by examiner

METHODS OF CONTROLLING FOUR-WHEEL STEERED VEHICLES

TECHNICAL FIELD

A vehicle includes a controller that facilitates control of the steering of front and rear wheels.

BACKGROUND

A conventional four-wheel steered vehicle includes a pair of steerable front wheels and a pair of steerable rear wheels. The four-wheel steered vehicle can be equipped with a stability control system. If the vehicle begins to lose traction with a roadway and/or begins to undergo a lateral slide, the stability control system controls operation of the steerable front wheels and the steerable rear wheels to reduce traction loss and/or reduce lateral instability. The stability control system can control the operation of the steerable front wheels and the steerable rear wheels according to a conventional feed-forward lateral acceleration value which can enhance control of the steerable wheels during operation. Use of the conventional feed-forward lateral acceleration value, however, can cause estimation errors in the stability control system, especially during operation of the vehicle at lower and/or higher speeds. The estimation errors can lead to control underactivation and/or control overactivation that adversely affects the ability of the stability control system to effectively reduce traction loss and/or reduce lateral instability.

SUMMARY

In accordance with one embodiment, a method for controlling a vehicle is provided. The vehicle comprises a pair of steerable front wheels and a pair of steerable rear wheels. The method comprises detecting a rear wheel steering angle of at least one of the steerable rear wheels and determining a feed-forward lateral acceleration value based upon the rear wheel steering angle and a scaling factor. The method further comprises controlling operation of the steerable front wheels and the steerable rear wheels in response to the feed-forward lateral acceleration value, the feed-forward lateral acceleration value facilitating feed-forward control of the steerable front wheels and the steerable rear wheels.

In accordance with another embodiment a method for controlling a vehicle is provided. The vehicle comprises a pair of steerable front wheels and a pair of steerable rear wheels. The method comprises detecting a front wheel steering angle of at least one of the steerable front wheels, detecting a rear wheel steering angle of at least one of the steerable rear wheels, and determining an effective rear wheel steering angle value from the rear wheel steering angle and a scaling factor. The method further comprises determining an overall Ackerman angle and determining a double Ackerman geometry steering angle value based upon the overall Ackerman angle and an Ackerman scaling factor. The method further comprises determining a feed-forward lateral acceleration value based upon the front wheel steering angle, the effective rear wheel steering angle value, and the double Ackerman geometry steering angle value, the feed-forward lateral acceleration value facilitating feed-forward control of the steerable front wheels and the steerable rear wheels. The method still further comprises controlling operation of the steerable front wheels and the steerable rear wheels in response to the feed-forward lateral acceleration value In accordance with yet another embodiment a method for controlling a vehicle is provided. The vehicle comprises a pair of steerable front wheels and a pair of steerable rear wheels. The method comprises detecting a front wheel steering angle of at least one of the steerable front wheels and detecting a rear wheel steering angle of at least one of the steerable rear wheels. The method further comprises detecting a vehicular yaw rate, detecting a vehicular speed, determining a yaw-based scaling factor based upon the vehicular yaw rate, determining a speed-based scaling factor based upon the vehicular speed, and determining an effective rear wheel steering angle value from the rear wheel steering angle, the yaw-based scaling factor, and the speed-based scaling factor. The method further comprises determining an overall Ackerman angle and determining a double Ackerman geometry steering angle value based upon the overall Ackerman angle and an Ackerman scaling factor. If the vehicular speed is above a threshold speed, the method further comprises determining a feed-forward lateral acceleration value based upon the front wheel steering angle and the effective rear wheel steering angle. If the vehicular speed is equal to or below the threshold speed, the method alternatively comprises determining a feed-forward lateral acceleration value based upon the front wheel steering angle, the effective rear wheel steering angle, and the double Ackerman geometry steering angle value. The method still further comprises controlling operation of the steerable front wheels and the steerable rear wheels in response to the feed-forward lateral acceleration value, wherein the feed-forward lateral acceleration value facilitates feed-forward control of the steerable front wheels and the steerable rear wheels.

BRIEF DESCRIPTION OF THE DRAWINGS

Various embodiments will become better understood with regard to the following description, appended claims and accompanying drawings wherein:

DETAILED DESCRIPTION

Figure 1:
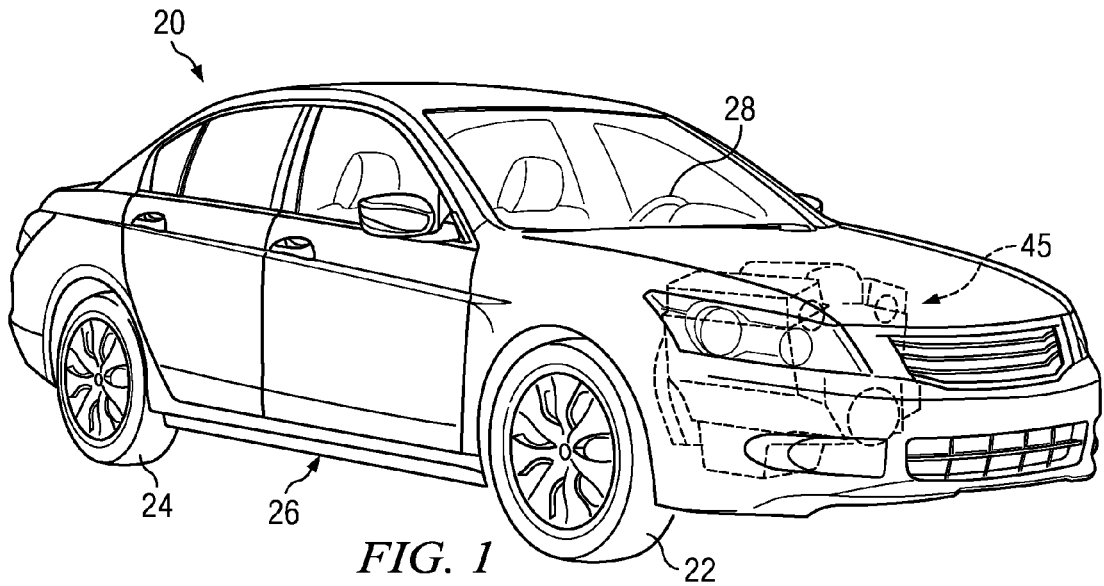
FIG. 1 is a right front perspective view depicting a vehicle, in accordance with one embodiment.

Embodiments are hereinafter described in detail in connection with the views of FIGS. 1-7, wherein like numbers indicate the same or corresponding elements throughout the views. A vehicle 20 in accordance with one embodiment can comprise an automobile, as illustrated in FIG. 1, or any of a variety of other suitable vehicles, such as a recreational vehicle or a utility vehicle, for example. In one embodiment, as depicted in FIG. 1, the vehicle 20 can comprise a four-wheel steered (e.g. 4WS or all-wheel steer AWS) vehicle having front wheels 22 and rear wheels 24 that are steerable with respect to a frame 26.

The vehicle 20 can include a steering wheel 28, as illustrated in FIG. 1, which can facilitate turning of the front and rear wheels 22, 24 to steer the vehicle 20. In one embodiment, the front wheels 22 can be coupled with the steering wheel 28 in a rack and pinion-type arrangement. When the steering wheel 28 is moved, the rack and pinion arrangement can operate to steer the front wheels 22. The rear wheels 24 can be associated with electronic actuators that are in electrical communication with the steering wheel 28 and controlled in a drive-by-wire type arrangement. When the steering wheel 28 is moved, the electronic actuators can facilitate pivoting of the rear wheels 24 based upon the position of the steering wheel 28. It will be appreciated that the front wheels 22 and the rear wheels 24 can be steered with a steering wheel in any of a variety of suitable alternative mechanical and/or electrical arrangements.

When the steering wheel 28 is turned to steer the vehicle 20, the front wheels 22 can turn in the same direction as the steering wheel 28. The rear wheels 24, however, can be controlled to turn in either the same direction as the front wheels 22 (e.g., in phase with the front wheels 22 as illustrated by dashed lines in FIG. 2) or in an opposite direction from the front wheels 22 (e.g., out of phase with the front wheels 22 as illustrated in solid lines in FIG. 2). In one embodiment, the turning direction of the rear wheels 24 with respect to the front wheels 22 can be controlled differently depending upon the speed of the vehicle 20. For example, when the vehicle 20 is travelling below a threshold speed, such as below about 60 kilometers per hour (KPH), the rear wheels 24 can be controlled to turn out-of-phase with the front wheels 22, which can facilitate a smaller turning radius than might otherwise be achieved with two wheel turning (e.g., turning of only the front wheels 22). When the vehicle 20 operates above a threshold speed, such as above about 60 KPH, turning the rear wheels 24 out-of-phase with the front wheels 22 might compromise the stability of the vehicle 20 or diminish effective cornering of the vehicle 20 through a turn. Therefore, in some embodiments, during operation of the vehicle 20 above a threshold speed, the rear wheels 24 can be controlled to turn in-phase with the front wheels 22 and/or, in other embodiments, the rear wheels 24 might not be turned at all.

In one embodiment, when the rear wheels 24 are controlled to turn out-of-phase with the front wheels 22, the rear wheels 24 can turn simultaneously with the front wheels 22. But, in another embodiment, when the rear wheels 24 are controlled to turn in-phase with the front wheels 22, the rear wheels 24 might not begin to turn until the front wheels 22 reach a predetermined angle. It will be appreciated, however, that the rear wheels 24 can be configured to turn at any of a variety of angles and/or sequences with respect to the front wheels 22.

Figure 2:
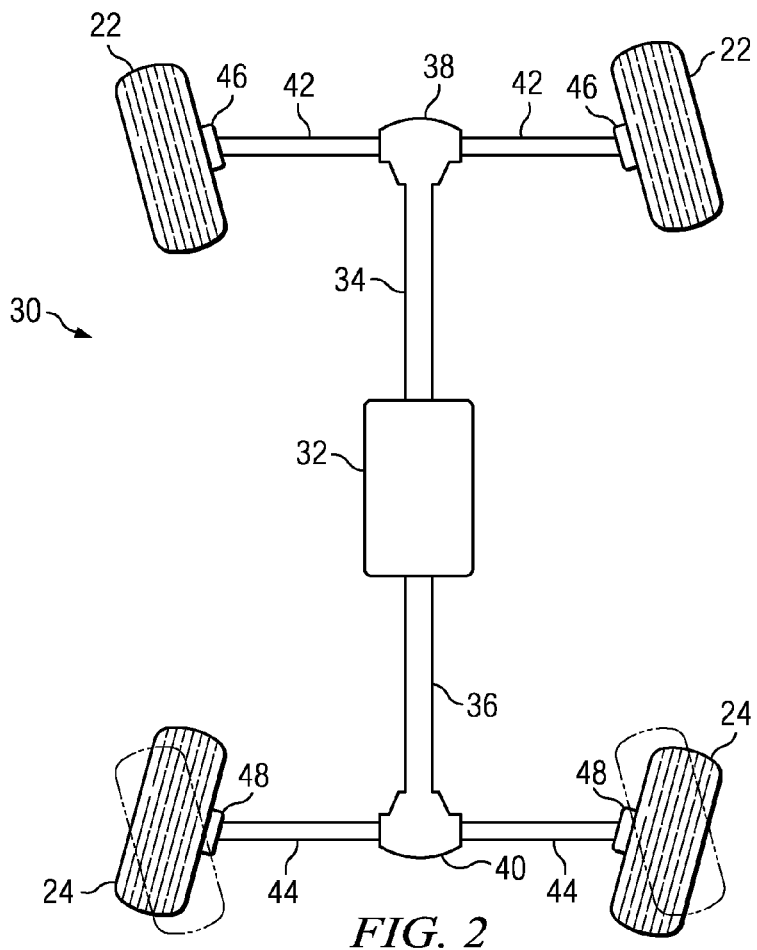
FIG. 2 is a schematic view depicting a drive train of the vehicle of FIG. 1, wherein the rear wheels, which are able to steer independently of one another, are shown turned out of phase in solid lines and in-phase in dashed lines.

As illustrated in FIG. 2, the vehicle 20 can include a drivetrain 30 that includes a transmission 32 operably coupled with front and rear drive shafts 34, 36. Each of the drive shafts 34, 36 can be coupled with respective front and rear differentials 38, 40. The front and rear differentials 38, 40 and the front and rear wheels 22, 24 can be coupled together by respective pairs of front and rear axle shafts 42, 44. An engine (45 shown in FIG. 1) can be coupled with the transmission 32 and can provide motive power to the transmission 32 to facilitate driving of at least one of the front wheels 22 and/or at least one of the rear wheels 24. The transmission 32 can be operable in one of a plurality of gears to facilitate effective operation of the vehicle 20 at different speeds.

Figure 3:
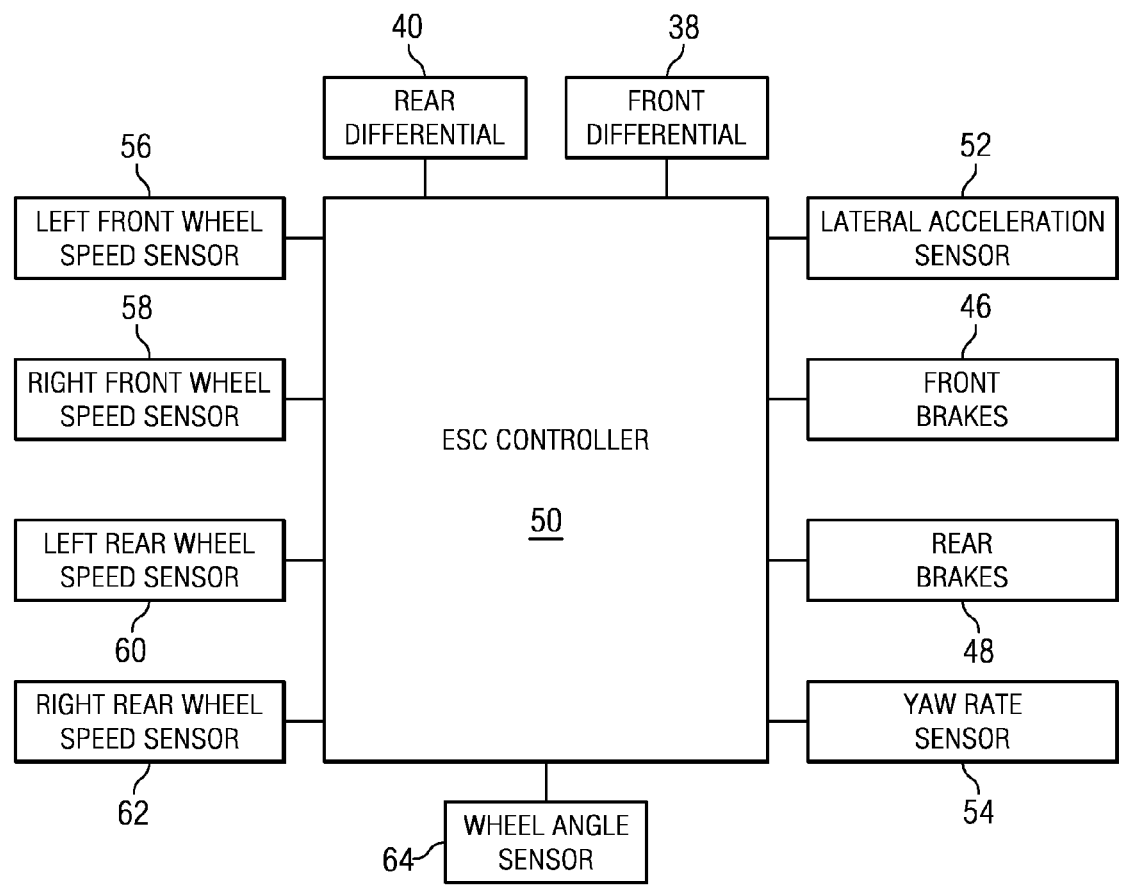
FIG. 3 is a block diagram of an electronic stability control (ESC) controller and certain other components of the vehicle of FIG. 1.

As illustrated in FIG. 3, the vehicle 20 can include front brakes 46 and rear brakes 48 associated with the front wheels 22 and the rear wheels 24, respectively. During operation of the vehicle 20, the front and rear brakes 46, 48 can be operated to facilitate selective stopping of the vehicle 20. In one embodiment, the front brakes 46 can comprise disk brakes and the rear brakes 48 can comprise drum brakes. In such an embodiment, each of the front wheels 22 can include a rotor and each of the rear wheels 24 can include a brake drum. When the front brakes 46 are actuated, calipers can press respective brake pads against the respective rotors to stop the front wheels 22. When the rear brakes 48 are actuated, braking cylinders can press respective brake shoes against the respective drums to stop the rear wheels 24. In another embodiment, the rear brakes 48 can be disk brakes. In other embodiments, the front and rear brakes 46, 48 can be configured in any of a variety of suitable alternative arrangements.

The vehicle 20 can include a foot actuated pedal (not shown), or other similar device, that facilitates selective manual operation of the front and rear brakes 46, 48 to stop the vehicle 20. In one embodiment, the front and rear brakes 46, 48 can be part of an anti-lock brake system (ABS). When the operator actuates the foot pedal, the ABS can automatically control the operation of the front and rear brakes 46, 48 to slow and stop the vehicle 20 while preventing the front and rear wheels 22, 24 from losing traction with the roadway during the braking.

As illustrated in FIG. 3, the vehicle 20 can comprise an ESC controller 50 that is configured to monitor and facilitate the overall stability of the vehicle 20. If the vehicle 20 begins to lose traction with a roadway and/or begins to undergo a lateral slide, the ESC controller 50 can control operation of the front and rear wheels 22, 24 to reduce traction loss and/or reduce lateral instability (e.g., facilitate effective handling and stability control for the vehicle 20). The ESC controller 50 can comprise an engine control unit (ECU), a power train control module (PCM), an engine control module (ECM) and/or any of a variety of other suitable vehicular controllers.

In one embodiment, as illustrated in FIG. 3, the ESC controller 50 can be coupled with each of the front and rear differentials 38, 40 and the front and rear brakes 46, 48. The ESC controller 50 can be configured to operate each of the front and rear differentials 38, 40 and/or each of the front and rear brakes 46, 48 to control operation of the front and rear wheels 22, 24 during traction loss or lateral instability. For example, when any of the front wheels 22 or rear wheels 24 begins to slip, the ESC controller 50 can automatically operate the brake(s) of the slipping wheel(s) to reduce wheel speed of the slipping wheel(s).

Additionally or alternatively, the ESC controller 50 can automatically operate the front and rear differentials 38, 40 to reduce torque to the slipping wheel(s) and redistribute it to non-slipping wheels. In one embodiment, the front and rear differentials 38, 40 can comprise limited slip-type differentials. In such an embodiment, each of the front and rear differentials 38, 40 can comprise electromagnetic clutches that can be coupled with each of the front and rear axle shafts 42, 44. The electromagnetic clutches can be selectively and independently actuated to vary the torque distribution among the front and rear wheels 22, 24. It will be appreciated that any of a variety of other suitable alternative limited or variable-type differentials can be provided.

When the vehicle 20 is turning, merely controlling the wheel slip may not be sufficient to prevent the vehicle 20 from diverging from its intended path (e.g., losing control). Therefore, when the vehicle 20 turns, the ESC controller 50 can facilitate selective control of the operation of the front and rear wheels 22, 24 to reduce wheel slip as well as oppose the divergence of the vehicle 20 from its intended path. For example, when the vehicle 20 begins to lose control during a turn, the ESC controller 50 can automatically operate the brake(s) and, additionally or alternatively, control operation of the front and rear differentials 38, 40 to oppose the loss of control and effectively "steer" the vehicle 20 back to its intended path.

It will be appreciated that when the vehicle 20 turns, if the front wheels 22 and/or rear wheels 24 begin to lose traction with the roadway, the vehicle 20 might be susceptible to understeer (e.g., the vehicle 20 follows a path having a larger radius than the intended turn) or oversteer (e.g., the vehicle 20 follows a path having a smaller radius than the intended turn). In one embodiment, the ESC controller 50 can be configured to control operation of the front and rear wheels 22, 24 to counteract the effects of oversteer and understeer on the vehicle 20 during turning and maintain the vehicle 20 on its intended path. For example, if the vehicle 20 begins to oversteer during a right-hand turn, the ESC controller 50 can facilitate operation of the front brake 46 of the left front wheel to prevent the oversteer and maintain effective control of the vehicle 20 through the turn. If the vehicle 20 begins to understeer during a right hand turn, the ESC controller 50 can operate the rear brake 48 of the right rear wheel to prevent the understeer and maintain effective control of the vehicle 20 through the turn.

It will be appreciated that in some embodiments, the ESC controller 50 might only control operation of the front and rear differentials 38, 40, or the front and rear brakes 46, 48, but not both. It will also be appreciated that the ESC controller 50 can control operation of the front wheels 22 and/or rear wheels 24 with any of a variety of other suitable vehicular devices and/or chassis devices, such as, for example, all-wheel drive torque control, ESC braking control, steering control, and active suspension control systems, to facilitate effective handling and lateral stability for the vehicle 20.

The ESC controller 50 can be configured to control operation of the front and rear wheels 22, 24 using feedback control. In one embodiment, the ESC controller 50 can detect a yaw rate, lateral acceleration, and speed of the vehicle 20. If the vehicle 20 begins to undergo wheel slip and/or loss of control, the ESC controller 50 can detect the wheel slip and/or loss of control from the yaw rate, the lateral acceleration, and/or the speed of the vehicle 20 and can tailor the operation of the front and rear wheels 22, 24 according to the yaw rate, the lateral acceleration, and/or the speed of the vehicle 20 to keep the vehicle 20 under control. For example, when one of the wheels begins to slip, the ESC controller 50 can detect the change in speed of the slipping wheel and can control operation of the front and rear wheels 22, 24 to reduce the speed of the slipping wheel. If the vehicle begins to diverge from its intended path (e.g., lose control), the ESC controller 50 can detect sudden changes in the lateral acceleration and/or yaw rate and can control operation of the front and rear wheels 22, 24 to oppose the sudden changes and prevent the traction loss and/or loss of control. It will be appreciated that the ESC controller 50 can detect and control any of a variety of control variables on a vehicle that facilitate feedback control of the operation of the front and rear wheels 22, 24.

For example, as illustrated in FIG. 3, the ESC controller 50 can be coupled with a lateral acceleration sensor 52 that facilitates detection of the lateral acceleration of the vehicle 20. In one embodiment, the lateral acceleration sensor 52 can comprise an accelerometer, but in other embodiments, the lateral acceleration sensor 52 can comprise any of a variety of other suitable arrangements that facilitate detection of a vehicle's lateral acceleration. As illustrated in FIG. 3, the ESC controller 50 can be coupled with a yaw rate sensor 54 that facilitates detection of the yaw rate of the vehicle 20. In one embodiment, the yaw rate sensor 54 can comprise a gyroscopic sensor (e.g., piezoelectric or micromechanical) that measures angular velocity around a vertical axis, but in other embodiments, can comprise any of a variety of other suitable arrangements that facilitate detection of a vehicle's yaw rate.

As illustrated in FIG. 3, the ESC controller 50 can be coupled with a front left wheel speed sensor 56, a front right wheel speed sensor 58, a left rear wheel speed sensor 60, and a right rear wheel speed sensor 62. In one embodiment, the wheel speed sensors 56, 58, 60, and 62 can each comprise a hall effect type sensor located adjacent to a respective one of the front and rear wheels 22, 24 to directly obtain wheel speed data. However, in other embodiments, the wheel speed sensors 56, 58, 60, and 62 can be any of a variety of other suitable speed sensor arrangements such as, for example, sensors associated with one or more of the front and rear axle shafts 42, 44, a transmission, a transfer assembly, and/or an engine, which can indirectly obtain wheel speed data.

It will be appreciated that the ESC controller 50 can additionally or alternatively detect the lateral acceleration, the yaw rate, and/or the wheel speed of the vehicle 20 from a variety of other sensors and devices on the vehicle 20. In some embodiments, the ESC controller 50 can communicate with a control area network (CAN) bus to facilitate detection of lateral acceleration, the yaw rate, and/or the wheel speed.

It will be appreciated that feedback control of the front and rear wheels 22, 24 can be susceptible to feedback lag (delayed control response associated with feedback control), which can diminish the overall responsiveness of the ESC controller 50 in facilitating effective handling and stability control for the vehicle 20. In one embodiment, the ESC controller 50 can be configured to facilitate feed-forward control of the front and rear wheels 22, 24 in addition to, or in lieu of, feedback control. In such a configuration, the ESC controller 50 can control the front and rear wheels 22, 24 according to a feed-forward lateral acceleration value Ay (e.g., a feed-forward input) which can be predictive of the lateral acceleration of the vehicle 20. The feed-forward lateral acceleration value Ay can supplement any real-time data collected with regard to the lateral acceleration (e.g., from the lateral acceleration sensor 52) and can reduce feedback lag and can enhance the overall responsiveness, accuracy, and/or robustness of the ESC controller 50 such as, for example, during acceleration of the vehicle 10 through a turn or during distribution of torque among the front and rear wheels 22, 24. Information from the feed-forward lateral acceleration value Ay can be useful in determining other operating characteristics of the vehicle 10, such as yaw rate, in lieu of using a dedicated sensor or during failure of certain sensors. The information from the feed-forward lateral acceleration value Ay can be distributed (e.g., via the CAN bus) for use in other vehicular control systems.

In one embodiment, the feed-forward lateral acceleration value Ay can be represented as a vector. In such an embodiment, the magnitude and the direction of the lateral acceleration vector can affect the control of the operation of the front and rear wheels 22, 24.

In one embodiment, the feed-forward lateral acceleration value Ay can be represented by the following expression:

$$Ay = \frac{Vx * \delta t}{L + Kus * Vx^2}$$

where Vx is the vehicular speed, δt is a total effective steering angle value, L is a wheelbase length of the vehicle 20, and Kus is an understeer gradient. To determine the total effective steering angle value δt, the detected front steering angle (e.g., the steering angle of the front wheels as controlled with the steering wheel 28) can be adjusted with an effective (i.e., calculated) rear steering angle.

The total effective steering angle value δt can be represented by the following expression:

$$\delta t = \delta f - \delta rm$$

where δf is a value of the detected front steering angle and δrm is a value of the effective rear steering angle. By adjusting the detected front steering angle with an effective rear steering angle, the ESC controller 50 can accommodate for turning of the rear wheels 24 which can facilitate more effective and precise stability control and/or traction control than could be achieved by monitoring turning of only two wheels (e.g., the front wheels 22). The vehicle 10 can accordingly be less susceptible to the estimation errors, the control underactivation and/or the control overactivation that oftentimes occur as a result of using a conventional ESC controller.

The detected front steering angle can be detected from a wheel angle sensor 64 coupled with the ESC controller 50, as illustrated in FIG. 3. In one embodiment, the wheel angle sensor 64 can comprise a steering wheel angle sensor that is associated with the steering wheel 28. In such an embodiment, the steering wheel angle sensor can facilitate detection of the position of the steering wheel 28 and the ESC controller 50 can extrapolate the front steering angle from the position of the steering wheel 28. The wheel angle sensor 64 can comprise one or more potentiometers and/or any of a variety of other suitable alternative arrangements that can facilitate detection of a steering wheel position. It will be appreciated that the vehicle 20 can additionally or alternatively include any of a variety of other suitable wheel angle sensors, such as position sensors mounted adjacent to each of the front wheels 22, for example.

In one embodiment, the effective rear steering angle can be determined from the steering angle of the left and right rear wheels. In one embodiment, the effective rear steering angle can be extrapolated from information from the steering wheel angle sensor 64, but in other embodiments, the effective rear steering angle can be detected from any of a variety of suitable alternative sources, such as from information provided to the CAN bus.

When the vehicle 10 is turned, each of the rear wheels 24 can turn at different angles (e.g., asymmetrically) to facilitate effective cornering of the vehicle 20. In order to accommodate for the asymmetry between the rear wheels 24 and enhance the overall responsiveness, accuracy, and/or robustness of the ESC controller 50, a speed-based scaling factor Kvr and a yaw-based scaling factor Kyr can be applied to the left and right rear steering angles to achieve the effective rear steering angle value arm.

The speed-based scaling factor Kvr and the yaw-based scaling factor Kyr can be dependent upon the speed and the yaw rate of the vehicle 20, respectively. In such an embodiment, as the speed or the yaw rate increases, the speed-based scaling factor Kvr and the yaw-based scaling factor Kyr can respectively decrease to decrease the effective rear steering angle value arm. When the vehicle 20 enters a turn, the effect of the rear steering angle on the feed-forward lateral acceleration value Ay can therefore depend on the speed and yaw rate of the vehicle 20. The more severe the turn (e.g., the greater the speed and/or the higher the vehicle lateral acceleration), the less the detected rear steering angle factors into the feed-forward lateral acceleration value Ay. By selectively reducing the effect of the detected rear steering angle in this way, feed-forward control of the front and rear wheels 22, 24 can be more robust and precise than some conventional control systems which are prone to ineffective feed-forward control during operation of a four-wheel steer vehicle at increased speeds and/or lateral accelerations.

In one embodiment, the ESC controller 50 can detect the vehicular speed from at least one of the front left wheel speed sensor 56, the front right wheel speed sensor 58, the left rear wheel speed sensor 60, and the right rear wheel speed sensor 62. In such an embodiment, the ESC controller 50 can average the speed data collected from each of the wheel speed sensors 56, 58, 60, 62. In other embodiments, the ESC controller 50 can detect the vehicular speed from a speedometer, a GPS output, a CAN bus, or any of a variety of other suitable vehicular speed detection arrangements.

Figure 4:
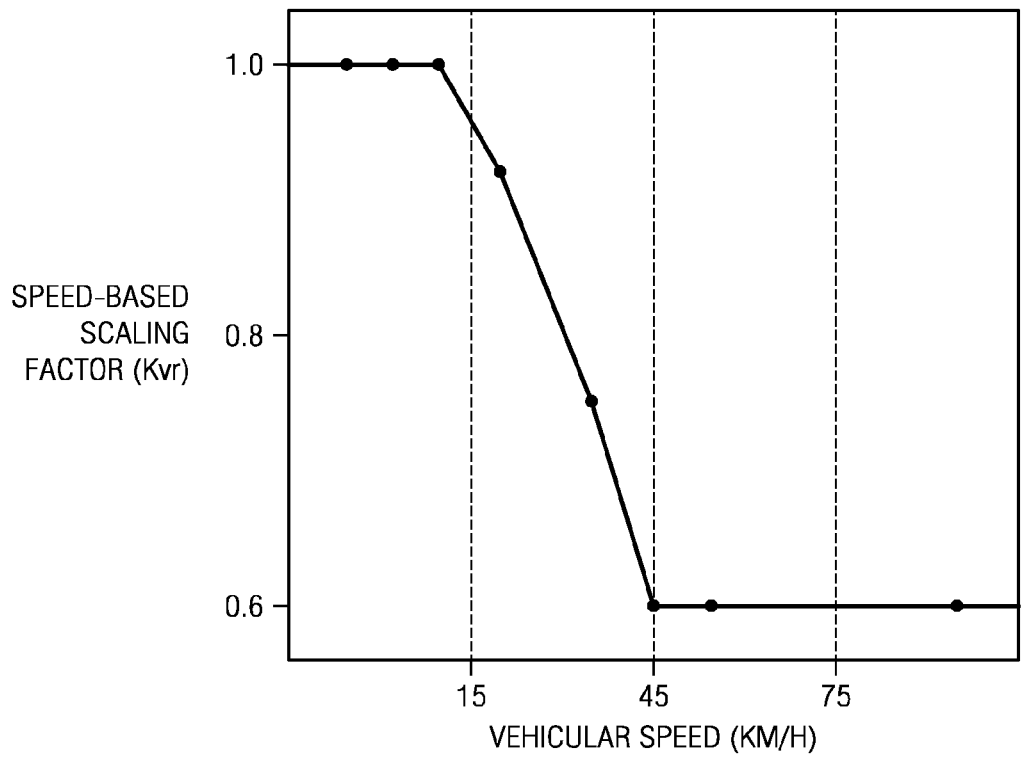
FIG. 4 is a plot depicting a relationship between a speed-based scaling factor and vehicular speed.

In one embodiment, the speed-based scaling factor Kvr can be maintained at a first value when the vehicular speed is below a first threshold speed value and at a second value when the vehicular speed is above a second threshold speed value. In such an embodiment, the speed-based scaling factor Kvr can vary between the first value and the second value when the speed is between the first threshold speed value and the second threshold speed value. The speed-based scaling factor Kvr can be determined according to a speed-based scaling factor map. One example of a speed-based scaling factor map is depicted in FIG. 4. In such an example, when the speed of the vehicle 20 is between about 0-15 KPH, the speed-based scaling factor Kvr can be maintained at about 1.0, when the speed is between about 15-45 KPH, the speed-based scaling factor Kvr can decrease from about 1 to about 0.6, and when the speed is above about 45 KPH, the speed-based scaling factor Kvr can be maintained at about 0.6. The effective rear steering angle δrm can accordingly vary between about 100% of the detected rear steering angle δr (e.g., the effective rear steering angle δrm=the detected rear steering angle) to about 60% of the rear steering angle δr depending upon the speed of the vehicle 20. It will be appreciated that any of a variety of suitable alternative speed-based scaling factor maps can be provided that facilitate effective scaling of a detected rear steering angle of the vehicle 20.

Figure 5:
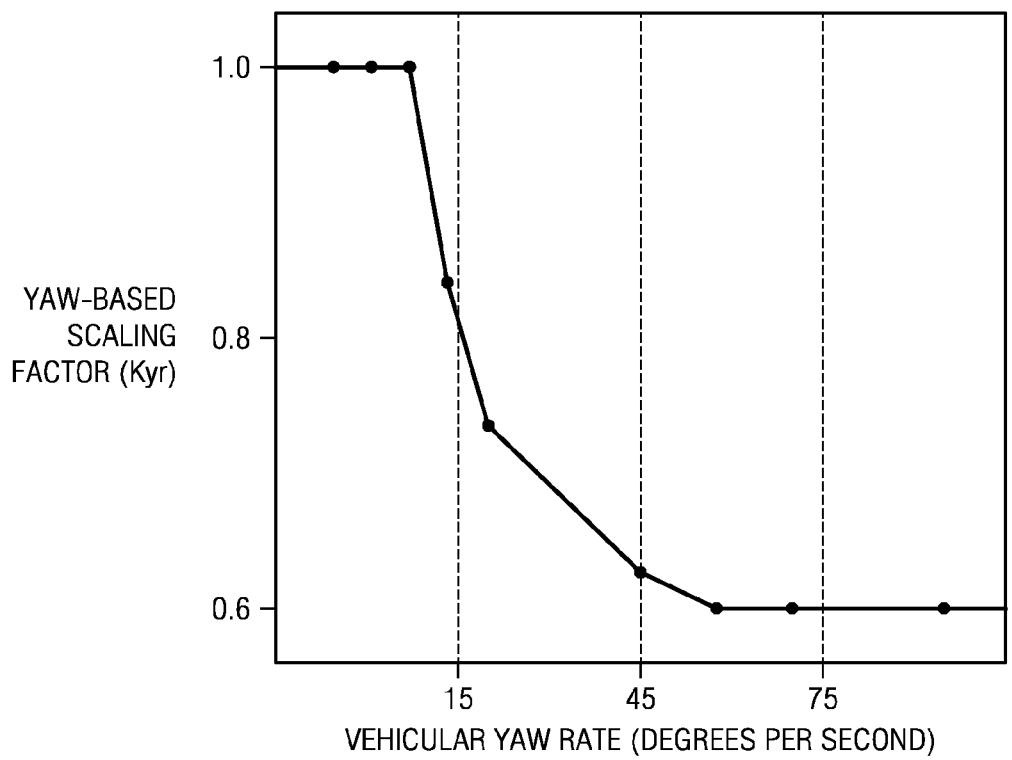
FIG. 5 is a plot depicting a relationship between a yaw-based scaling factor and vehicular yaw rate.

In one embodiment, the yaw-based scaling factor Kyr can be maintained at a first magnitude when the yaw rate is below a first threshold yaw rate value and at a second magnitude when the yaw rate is above a second threshold yaw rate value. In such an embodiment, the yaw-based scaling factor Kyr can vary between the first magnitude and the second magnitude when the yaw rate is between the first threshold yaw rate value and the second threshold yaw rate value. The yaw-based scaling factor Kyr can be determined according to a yaw-based scaling factor map. One example of a yaw-based scaling factor map is depicted in FIG. 5. In such an example, when the yaw rate of the vehicle 20 is between about 0-15 degrees per second (DPS), the yaw-based scaling factor Kyr can be about 1.0, when the yaw rate is between about 15-45 DPS, the yaw-based scaling factor Kyr can vary from about 1 to about 0.6, and when the yaw rate is above about 45 DPS, the yaw-based scaling factor Kyr can be about 0.6. The effective rear steering angle δrm can accordingly vary between about 100% of the detected rear steering angle (e.g., the effective rear steering angle δrm=the detected rear steering angle) to about 60% of the detected rear steering angle depending upon the yaw rate of the vehicle 20.

Each of the front steering angle value δf and the effective rear steering angle value δrm can be provided as respective vectors such that the total effective steering angle value δt comprises a resultant vector. When the front steering angle value δf and/or the effective rear steering angle value δrm changes, the resultant vector of the total effective steering angle value δt can change which can affect the feed-forward lateral acceleration value Ay and any resulting control of the operation of the front and rear wheels 22, 24.

It will be appreciated that by varying the speed-based scaling factor Kvr and the yaw-based scaling factor Kyr, the influence of the left and right rear steering angle (e.g., the detected rear steering angle) upon the total effective steering angle value δt can be varied. If the result of the speed-based scaling factor Kvr and the yaw-based scaling factor Kyr is less than 1, the detected rear steering angle can have less influence on the total effective steering angle value δt and thus the feed-forward lateral acceleration Ay. Conversely, if the result of the speed-based scaling factor Kvr and the yaw-based scaling factor Kyr is greater than 1, the detected rear steering angle can have more influence on the total effective steering angle value δt and thus the feed-forward lateral acceleration Ay.

Varying the influence of the rear steering angle on the total effective steering angle value δt can affect the control authority between the front and rear wheels 22, 24 when the ESC controller 50 is controlling the operation of the front and rear wheels 22, 24. For example, if the result of the speed-based scaling factor Kvr and the yaw-based scaling factor Kyr is less than 1, the vector of the feed-forward lateral acceleration value Ay might be more influenced by the detected front steering angle thus causing the ESC controller to weight the front steering angle more when determining how to transmit torque appropriately among the front and rear wheels 22, 24.

It will be appreciated that, as the speed and/or yaw rate of the vehicle 20 increases, the asymmetry between the rear wheels 24 can have an increasingly adverse effect on stability and/or traction control. Decreasing the speed-based scaling factor Kvr and the yaw-based scaling factor Kyr as the respective speed and yaw rate of the vehicle 20 increases can distribute more control authority to the front wheels 22. The asymmetry between the rear wheels 24 therefore has less of an affect during stability and/or traction control which can reduce the possibility of excessive torque or insufficient braking being provided to the rear wheels 24.

It will be appreciated that a determination of a feed-forward lateral acceleration value Ay can be in response to any of a variety of additional or alternative vehicular conditions. It will also be appreciated that the feed-forward lateral acceleration value Ay can contribute to feed-forward control of any of a variety of suitable alternative feed-forward control systems of the vehicle 20.

In one embodiment, when the vehicle 10 turns at lower speeds, such as below about 15 KPH, for example, the total effective steering angle value δt can be calculated according to a double Ackerman geometry steering angle δa instead of the effective rear steering angle value δrm identified above. In such an embodiment, the expression of the feed-forward lateral acceleration value Ay can be the same as described above, but the total effective steering angle value δt can instead be represented by the following expression:

$$\delta t = \delta f - \delta rm - \delta a$$

where δa is a double Ackerman geometry steering angle value.

Calculation of the feed-forward acceleration value Ay in this manner can be effective to reduce inaccuracies that some conventional stability control systems experience when the vehicle turns at lower speeds (e.g., below about 15 KPH). The double Ackerman geometry steering angle δa can be determined according to the detected rear steering angle, a wheelbase of the vehicle, and the respective wheel speeds of each of the rear wheels 22.

In one embodiment, the determination of whether to use the double Ackerman geometry steering angle δa when calculating the total effective steering angle value δt (and thus the lateral acceleration value Ay) can depend upon the speed of the vehicle 10. In one embodiment, if the speed of the vehicle 20 is above a threshold speed value (e.g., 15 K.P.H), the total effective steering angle value δt can be determined only according to the effective rear steering angle value δrm. If the speed of the vehicle 20 is below the threshold speed value, the total effective steering angle value δt can be determined according to the effective rear steering angle value δrm and the double Ackerman geometry steering angle δa.

Figure 6:
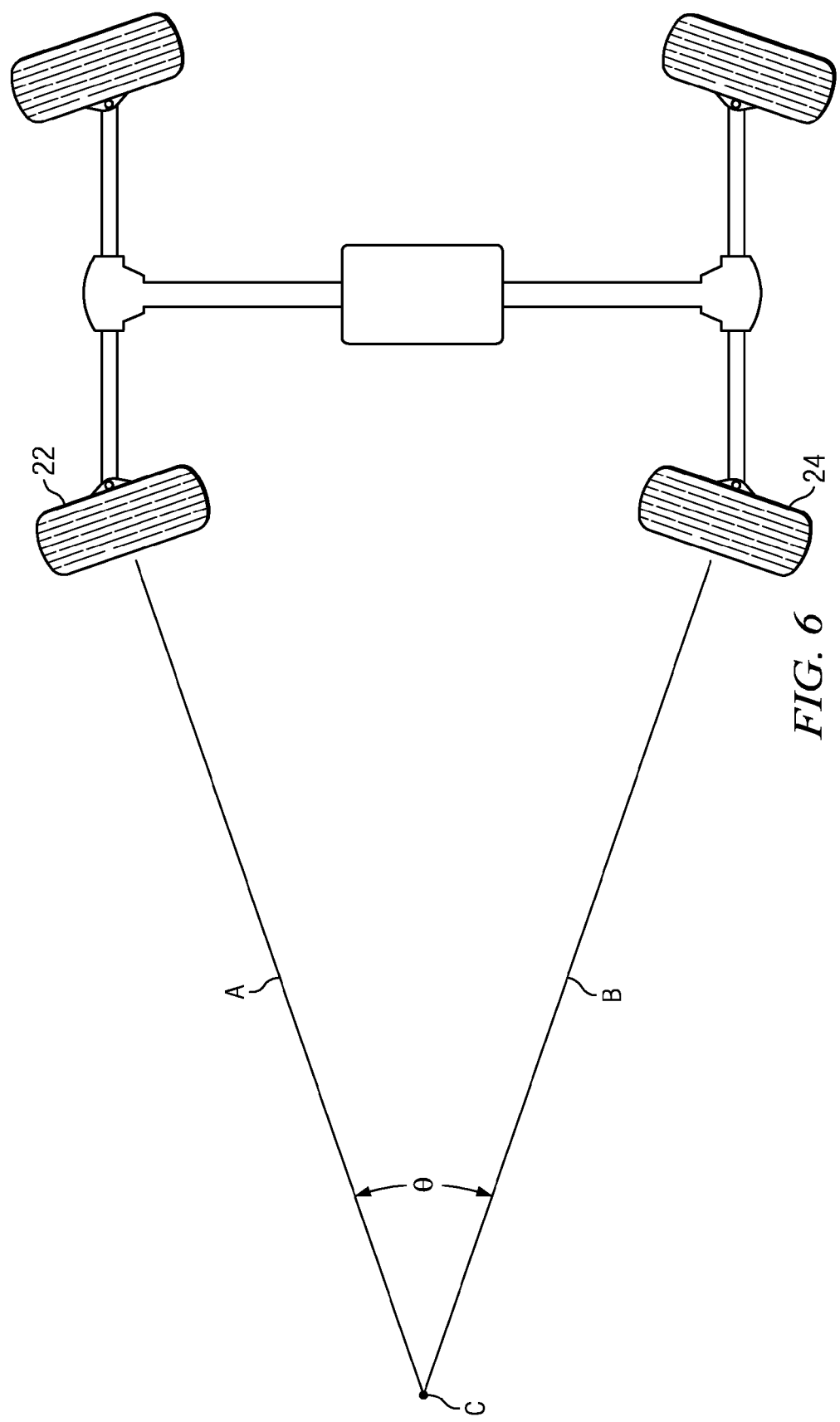
FIG. 6 is a schematic view depicting an overall Ackerman angle for the front wheels and rear wheels of the vehicle of FIG. 1.

The double Ackerman geometry steering angle δa can be determined by first determining an overall Ackerman angle for the vehicle 20 and then applying an Ackerman scaling factor to the overall Ackerman angle. For four-wheel steered vehicles, such as the vehicle 20, the overall Ackerman angle can be determined from the inside wheels during a turn (e.g., the left wheels for a left turn and the right wheels for a right turn). An example of an overall Ackerman angle (AOB) is depicted in FIG. 6 for the vehicle 20 during a left-hand turn. Lines A and B can extend along respective axes of rotation of the left front and left rear wheels and can intersect at a turning radius point C. The overall Ackerman angle can be the angle θ formed by the lines A and B. In one embodiment, the overall Ackerman angle can be calculated according to the following expression:

$$<AOB = \arctan\left(\frac{\frac{L}{Rr}}{\frac{L}{Rr} * \delta r + 1}\right)$$

where L is a wheelbase of the vehicle 20 (e.g., distance between the front wheels 22 and the rear wheels 24), Rr is a rear wheel turning radius, and δr is the rear steering angle. The rear wheel turning radius Rr can be calculated according to the following expression:

$$Rr = \frac{Wr * (Vo + Vi)}{2 * (Vo - Vi)}$$

where Vo is the wheel speed of the outside rear wheel (e.g., the right rear wheel for a leftward turn and the left rear wheel for a rightward turn), Vi is the wheel speed of the inside rear wheel (e.g., right rear wheel for a rightward turn and left rear wheel for a leftward turn) and Wr is the distance between the rear wheels 24.

In one embodiment, the Ackerman scaling factor can be a speed-based factor that decreases when the speed of the vehicle 20 increases. In such an embodiment, as the speed of the vehicle 20 increases, the Ackerman scaling factor can accordingly reduce the effect of the overall Ackerman angle on the feed-forward lateral acceleration value Ay. In one embodiment, the Ackerman scaling factor can decrease from a first magnitude to a second magnitude in response to the speed of the vehicle 20 increasing from a first Ackerman speed value to a second Ackerman speed value. For example, the Ackerman scaling factor can decrease from about 1 to about 0.5 in response to the speed of the vehicle 20 increasing from about 0 to the threshold value. As a result, the Ackerman correction value can vary between about 100% of the overall Ackerman angle and about 50% of the overall Ackerman angle as the speed of the vehicle 20 increases to the threshold value. In one embodiment, the Ackerman scaling factor can decrease linearly, but in other embodiments, the Ackerman scaling factor can be varied in any of a variety of suitable alternative manners (e.g., follow a piece-wise defined curve).

In one embodiment, the double Ackerman geometry steering angle δa can be calculated from the following expression:

$$\delta a = \arctan\left(\frac{\frac{L}{Rr}}{\frac{L}{Rr} * \delta r * Kvr + 1}\right)$$

However, it will be appreciated that any of a variety of suitable alternative expressions can be utilized to correct a feed-forward lateral acceleration value Ay with an overall Ackerman angle and a scaling factor when a vehicle 20 is below a threshold speed.

Figure 7:
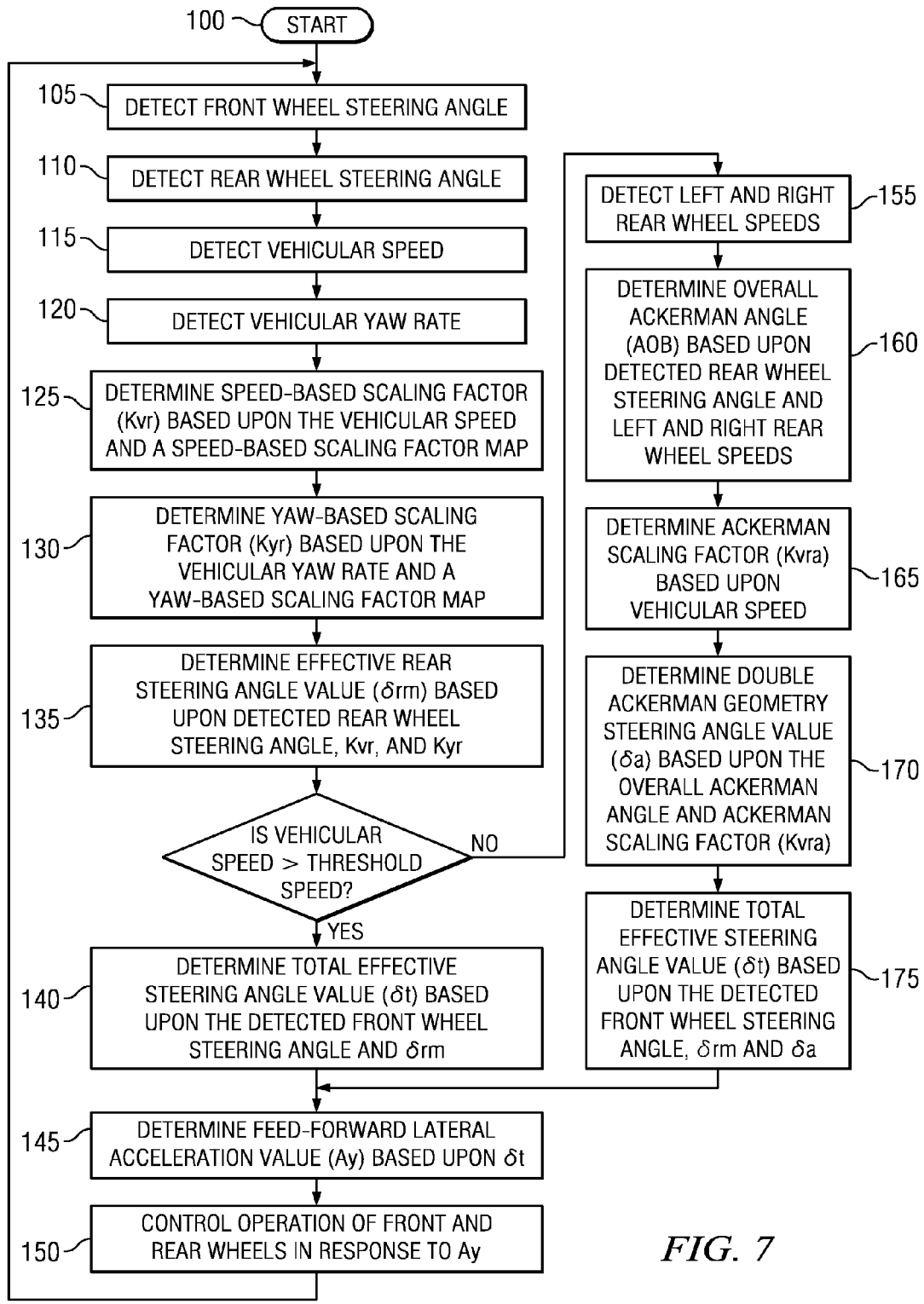
FIG. 7 is a flow chart depicting a control routine implemented by the ESC controller of FIG. 3, according to one embodiment.

One embodiment of a control routine implemented by the ESC controller 50 is generally illustrated in FIG. 7. Upon startup (100), the ESC controller 50 can detect the front wheel steering angle (105), the rear wheel steering angle (110), the vehicular speed (115), and the vehicular yaw rate (120). The ESC controller 50 can determine a speed-based scaling factor Kvr based upon the vehicular speed and a speed-based scaling factor map (125) and can determine a yaw-based scaling factor Kyr based upon the vehicular yaw rate and a yaw-based scaling factor map (130). The effective rear steering angle value δrm can be determined based upon the detected rear wheel steering angle, the speed-based scaling factor Kvr, and the yaw-based scaling factor Kyr (135). If the vehicular speed is greater than the threshold speed value, the total effective steering angle value δt can be determined based upon the front wheel steering angle and the effective rear wheel steering angle value δrm (140). The feed-forward lateral acceleration value Ay can be determined based upon the total effective steering angle value δt (145), and the operation of the front and rear wheels 22, 24 can be controlled in response to the feed-forward lateral acceleration value Ay (150) and the process can then start again.

If the vehicular speed is less than or equal to the threshold speed value, the ESC controller 50 can detect the wheel speed of the left and right rear wheels 24 (155) and can determine the overall Ackerman angle based upon the rear wheel steering angle and the wheel speed of the left and right rear wheels 24 (160). The ESC controller 50 can determine an Ackerman scaling factor based upon the vehicular speed (165) and can determine the double Ackerman geometry steering angle value δa based upon the overall Ackerman angle and the Ackerman scaling factor (170). The total effective steering angle value δt can be determined based upon the front wheel steering angle, effective rear wheel steering angle value δrm, and the double Ackerman geometry steering angle value δa (175). The feed-forward lateral acceleration value Ay can then be determined based upon the total effective steering angle value δt (145), the operation of the front and rear wheels 22, 24 can be controlled in response to the feed-forward lateral acceleration value Ay (150), and the process can then started again. It will be appreciated that the ESC controller 50 can perform certain steps of the control routine in any sequence, such as alternatively or parallel with one another, for example. It will also be appreciated that the ESC controller 50 can control operation of the front wheels 22 and/or rear wheels 24 in any of a variety of additional or alternative manners.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for controlling a vehicle, the vehicle comprising a pair of steerable front wheels and a pair of steerable rear wheels, the method comprising:
    detecting a front wheel steering angle of at least one of the steerable front wheels;
    detecting a rear wheel steering angle of at least one of the steerable rear wheels;
    determining an overall Ackerman angle;
    determining an effective rear wheel steering angle value from the rear wheel steering angle and a scaling factor;
    determining a double Ackerman geometry steering angle value based upon the overall Ackerman angle and an Ackerman scaling factor;
    determining a feed-forward lateral acceleration value based upon the front wheel steering angle, the effective rear wheel steering angle value, and the double Ackerman geometry steering angle value, the feed-forward lateral acceleration value facilitating feed-forward control of the steerable front wheels and the steerable rear wheels; and
    controlling operation of the steerable front wheels and the steerable rear wheels in response to the feed-forward lateral acceleration value.

2. The method of claim 1 further comprising:
    detecting a vehicular speed; and
    decreasing the Ackerman scaling factor from a first magnitude to a second magnitude when the vehicular speed increases from a first speed value to a second speed value.

3. The method of claim 1 further comprising:
    detecting a vehicular speed; and
    controlling operation of the steerable front wheels and the steerable rear wheels in response to the feed-forward lateral acceleration value when the vehicular speed is below a threshold value.

4. The method of claim 3 wherein the threshold value is about 15 KPH.

5. The method of claim 1 wherein determining an overall Ackerman angle comprises determining the overall Ackerman angle based upon the front wheel steering angle and the rear wheel steering angle.

6. The method of claim 1 wherein determining an overall Ackerman angle comprises:

detecting a speed of each of the rear wheels; and determining the overall Ackerman angle based upon the difference in speed between the rear wheels.

7. A method for operating a vehicle, the vehicle comprising a pair of steerable front wheels and a pair of steerable rear wheels, the method comprising:

detecting a front wheel steering angle of at least one of the steerable front wheels; and detecting a rear wheel steering angle of at least one of the steerable rear wheels;

detecting a vehicular yaw rate;

detecting a vehicular speed;

determining a yaw-based scaling factor based upon the vehicular yaw rate;

determining a speed-based scaling factor based upon the vehicular speed;

determining an effective rear wheel steering angle value from the rear wheel steering angle, the yaw-based scaling factor, and the speed-based scaling factor;

determining an overall Ackerman angle;

determining a double Ackerman geometry steering angle value based upon the overall Ackerman angle and an Ackerman scaling factor;

if the vehicular speed is above a threshold speed, determining a feed-forward lateral acceleration value based upon the front wheel steering angle and the effective rear wheel steering angle;

if the vehicular speed is equal to or below the threshold speed, determining a feed-forward lateral acceleration value based upon the front wheel steering angle, the effective rear wheel steering angle, and the double Ackerman geometry steering angle value; and controlling operation of the steerable front wheels and the steerable rear wheels in response to the feed-forward lateral acceleration value, wherein the feed-forward lateral acceleration value facilitates feed-forward control of the steerable front wheels and the steerable rear wheels.

8. The method of claim 7 further comprising decreasing the speed-based scaling factor from a first magnitude to a second magnitude when the vehicular speed increases from a first vehicular speed value to a second vehicular speed value.

9. The method of claim 8 further comprising decreasing the yaw-based scaling factor when the vehicular yaw rate increases.

10. The method of claim 9 further comprising decreasing the Ackerman scaling factor from a first magnitude to a second magnitude when the vehicular speed increases from a first speed value to a second speed value.

11. The method of claim 10 wherein the threshold value is about 15 KPH.

* * * * *

UNITED STATES PATENT AND TRADEMARK OFFICE
CERTIFICATE OF CORRECTION

PATENT NO. : 8,886,410 B2  
APPLICATION NO. : 13/765783  
DATED : November 11, 2014  
INVENTOR(S) : Xiaodi Kang et al.

Page 1 of 1

It is certified that error appears in the above-identified patent and that said Letters Patent is hereby corrected as shown below:

In the Specification

Column 7, line 55, change "value arm" to --value δrm--; and  
Column 7, line 62, change "value arm" to --value δrm--.

Signed and Sealed this  
Thirty-first Day of March, 2015

Michelle K. Lee  
*Director of the United States Patent and Trademark Office*